United States Patent
Tuttle et al.

[15] 3,703,932
[45] Nov. 28, 1972

[54] DISC TILLER

[72] Inventors: Floyd W. Tuttle, Tribune, Kans. 67879; Ralph W. Tuttle, Ulysses, Kans. 67880

[22] Filed: Aug. 31, 1970

[21] Appl. No.: 68,148

Related U.S. Application Data

[63] Continuation-in-part of Ser. No. 745,882, July 18, 1968, Pat. No. 3,543,865.

[52] U.S. Cl. .................................. 172/288, 172/484
[51] Int. Cl. ............................................. A01b 69/00
[58] Field of Search......172/204, 206, 207, 212, 220, 172/215, 228, 229, 278, 282, 284, 285, 286, 288, 289, 290, 291, 324, 313, 314

[56] References Cited

UNITED STATES PATENTS

| 382,019 | 5/1888 | Tolson | 172/288 X |
|---|---|---|---|
| 1,216,123 | 2/1917 | Howe | 172/288 X |
| 1,257,281 | 2/1918 | Davis et al. | 172/290 |
| 1,948,961 | 2/1934 | Davis | 172/291 X |
| 2,202,348 | 5/1940 | Leach | 172/212 |
| 2,780,158 | 2/1957 | Pursche | 172/212 X |
| 2,950,927 | 8/1960 | Hendrickson | 172/284 X |
| 2,982,363 | 5/1961 | Sweet et al. | 172/288 X |
| 3,066,746 | 12/1962 | Sweet | 172/314 X |
| 3,509,945 | 5/1970 | Vassberg | 172/285 |
| 3,516,500 | 6/1970 | Butler | 172/282 |
| 3,516,501 | 6/1970 | Sweet | 172/314 |
| 3,528,506 | 9/1970 | Drummond | 172/314 |
| 3,543,865 | 12/1970 | Tuttle et al. | 172/288 |
| 3,568,776 | 3/1971 | Vassberg | 172/285 |

*Primary Examiner*—Robert E. Pulfrey
*Assistant Examiner*—R.T. Rader
*Attorney*—John H. Widdowson

[57] ABSTRACT

A single-unit and a multiple-unit earth worker are provided. An elongated frame has earth-working members supported therebelow. A transversely disposed support member is centrally and pivotally attached to the rear end of the frame to pivot in a horizontal plane. The forward end of the frame has a pivotally mounted hitch, and a pivotally mounted wheel. The rear support member has a caster wheel mounted on each end. A first link connects the rear support member and the forward wheel, the link restraining same in normal position and operable to horizontally angle the wheel. A second link connects the first link and is rigidly connected to the hitch. A restraining link connects the transverse support member at the rear and the frame to restrict the extent of pivotal movement of the frame about the transverse support member. Turning linkage connects the frame and the hitch member. In the multi-unit embodiment, a plurality of caster wheels is used, one on each end of the frame and on opposite sides thereof. Caster linkage is connected to the hitch and the end caster wheels, such being operable to position the caster wheels relative the frame. Angular linkage connects the hitch and the frame, with such operable to rotate the hitch to proper position in relation to the frame, and turning linkage connects the frame and the hitch.

Numerous types of earth workers such as disc tillers are known in the prior art operable to be turned in either direction, to the right or left. However, these disc tillers are one normally operable to be pulled with the discs inclined in one direction and turn more easily in one direction than the other. Also, many of the prior art devices are adjustable for the depth of the cut by varying the height at the wheel supports; this is usually done by a hand adjustment.

6 Claims, 15 Drawing Figures

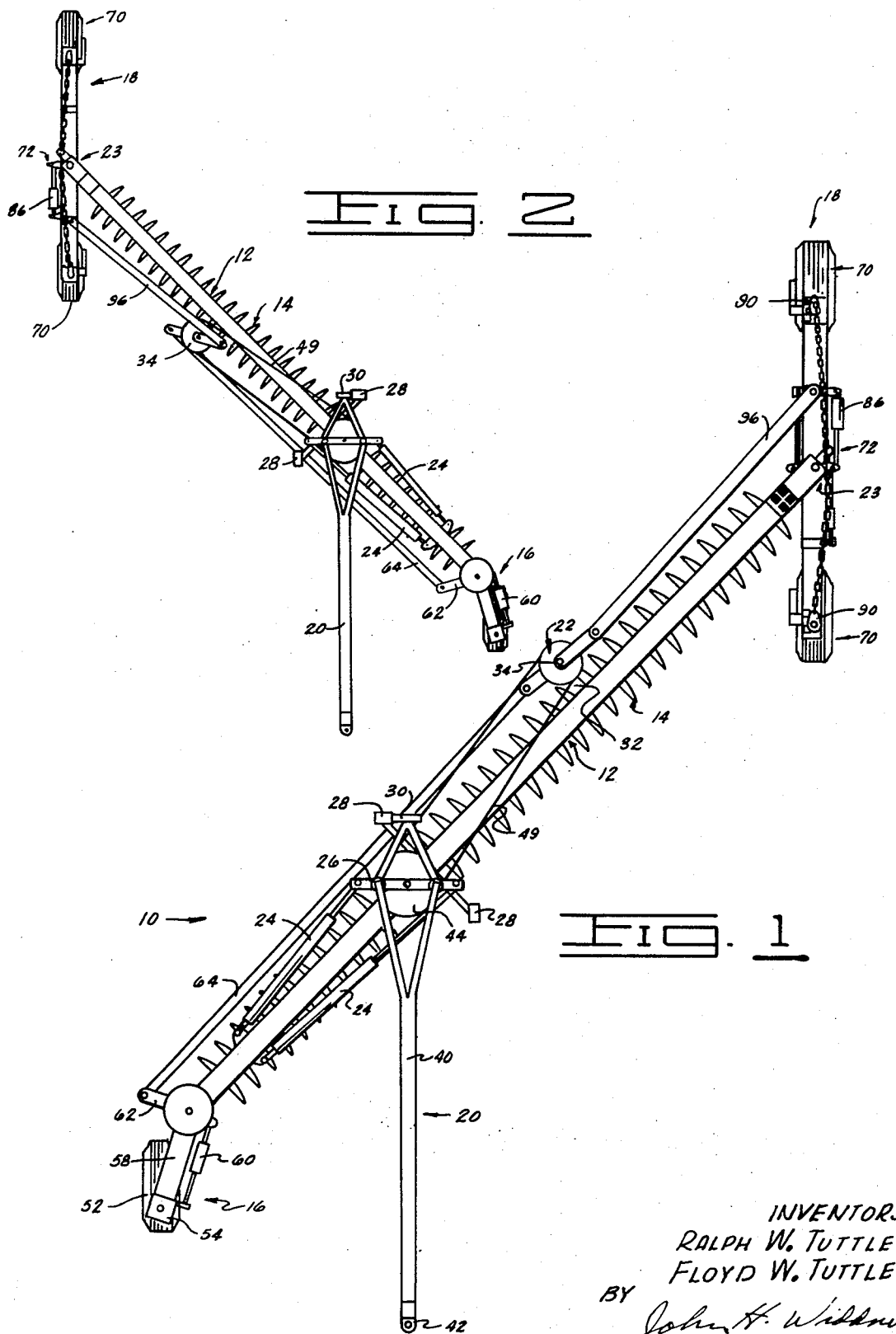

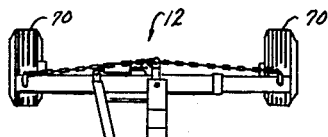
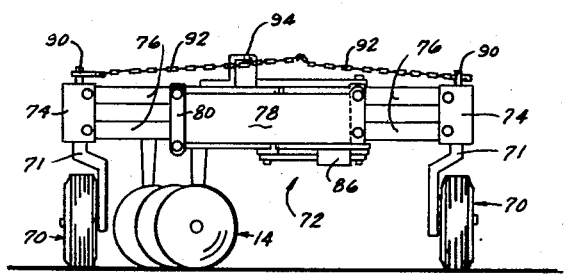
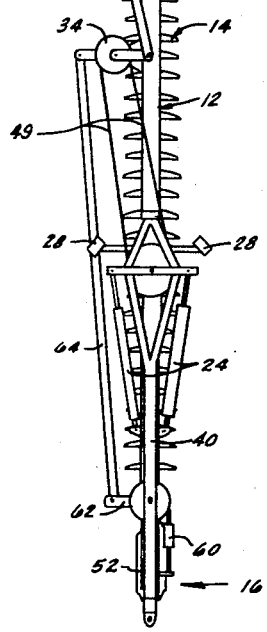
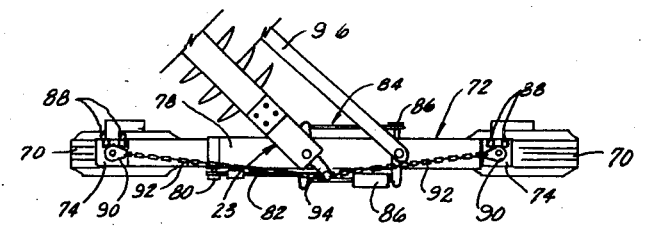
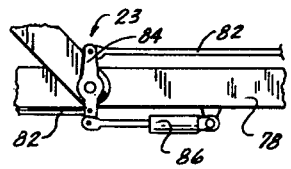
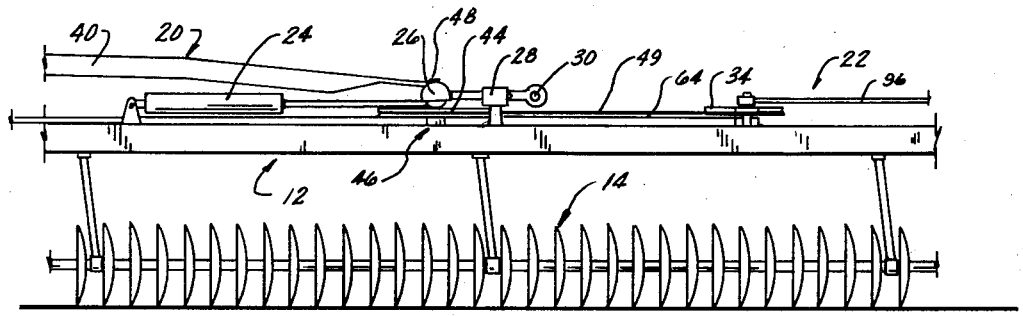

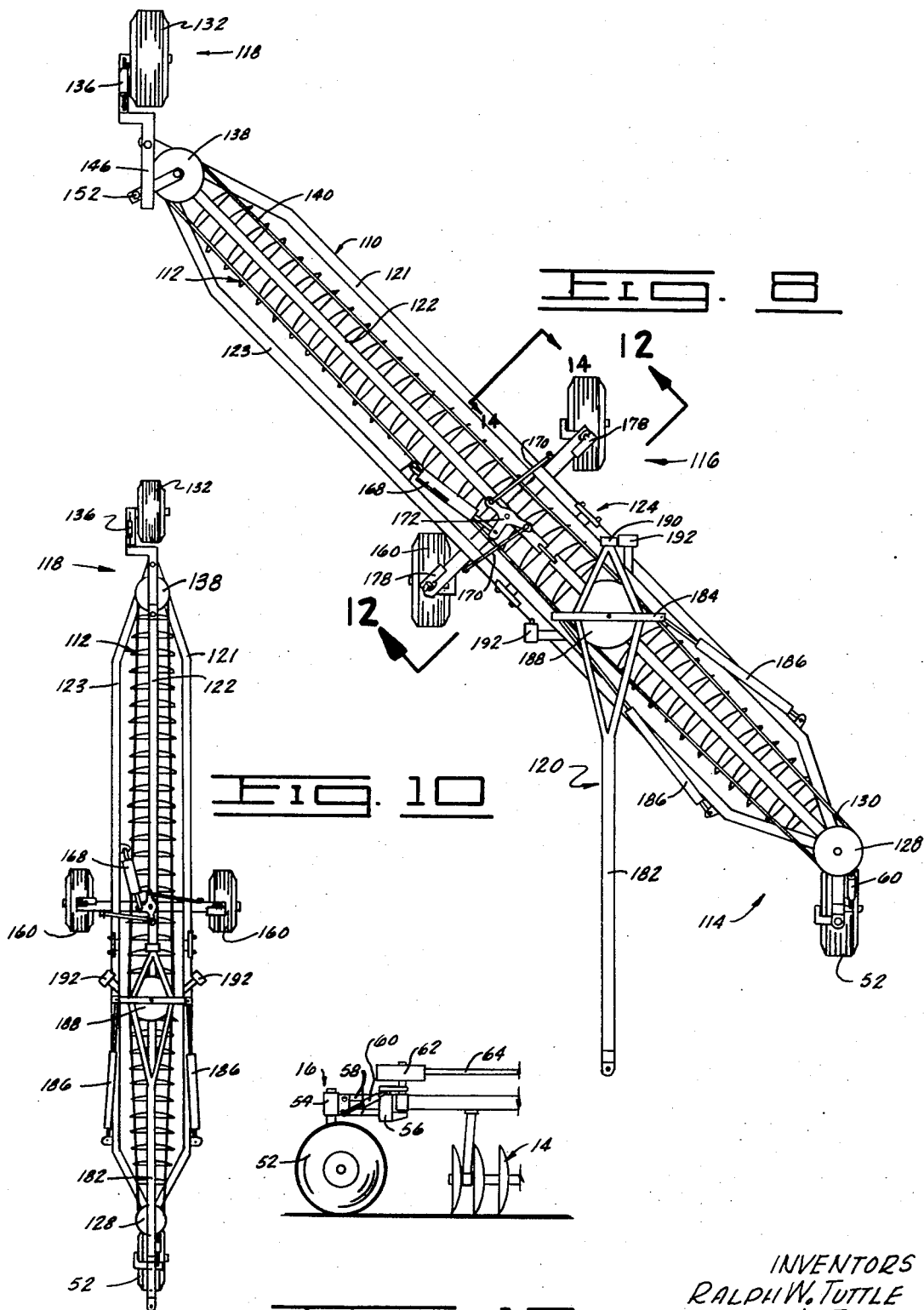

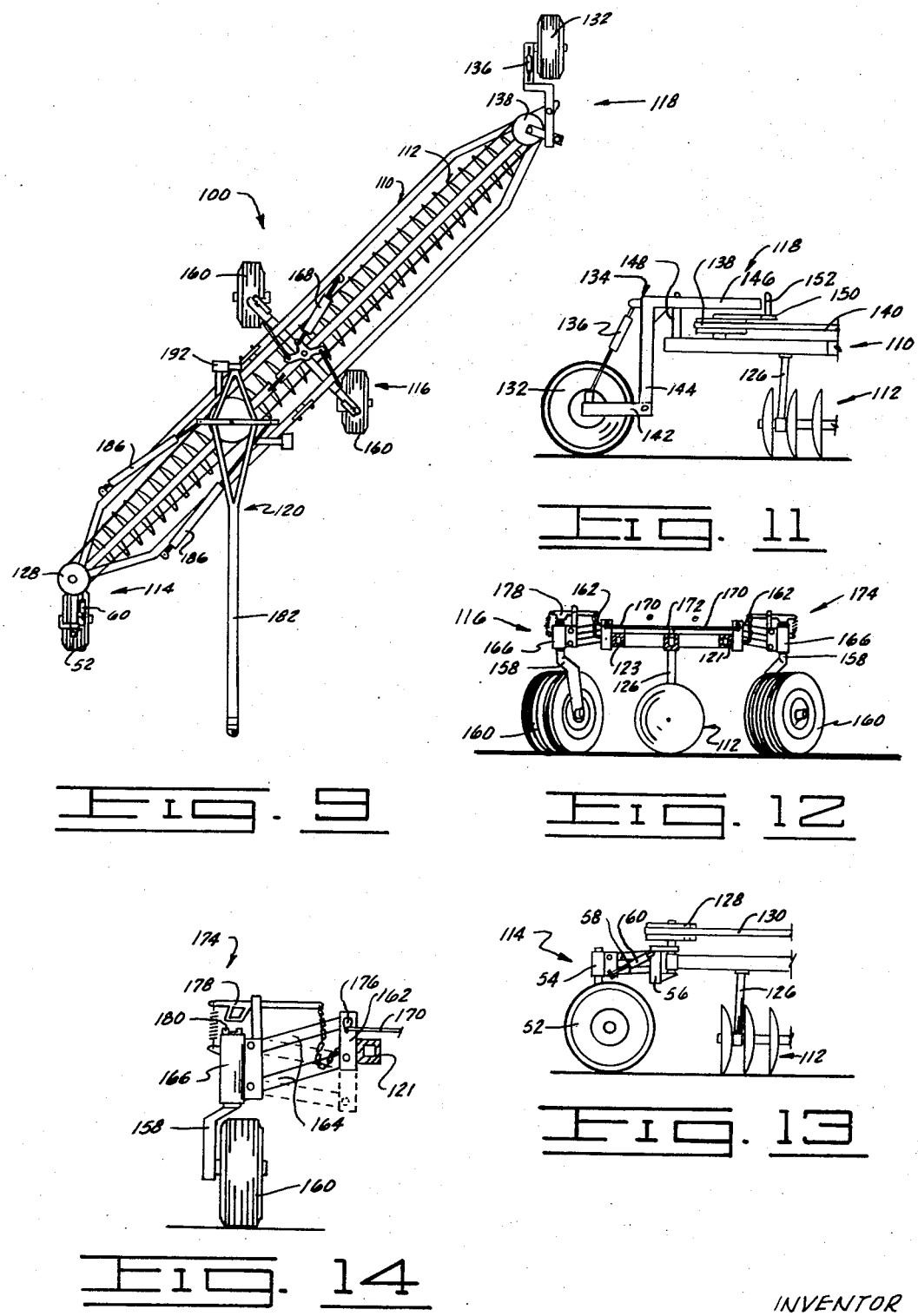

DISC TILLER

This is a continuation-in-part of pending patent application DISC TILLER, Ser. No. 745,882, filed July 18, 1968, now U.S. Pat. No. 3,543,865.

The improved earth worker of this invention includes two preferred specific embodiments described herein. In one preferred specific embodiment (1) an earth worker is provided having a line of discs supported below a one piece frame; the frame is held on the forward end by a caster wheel and on the rear end by a pair of caster wheels mounted on the ends of a transverse member. A hitch attaches the front end portion of the frame; it provides a means to pull the tiller with frame inclined either to the right or left and to provide a means to coordinate the wheels in making a turn.

In another preferred specific embodiment (2) a two-unit two-way earth worker is provided having a frame with a hinge coupling therebetween two frame segments. A line of discs are supported below the frame segments; the forward frame segment has a hitch which is coordinated by a linkage with a caster wheel on the forward end thereof; the rear frame segment has caster wheels mounted on opposite sides of the forward portion and a caster wheel on the rear end.

All the caster wheels in both of the herein described preferred specific embodiments are constructed to be easily adjusted in height by hydraulic pneumatic cylinders connected to each wheel. Height of the frame and discs above the ground is preferably controlled from the vehicle towing the disc tiller. Likewise, the angular position of the hitch relative the frame is controlled from the towing vehicle by hydraulic-pneumatic cylinders connecting them.

One object of this invention is to provide an earth worker overcoming the aforementioned disadvantages of the prior art devices.

Still, one other object of this invention is to provide an earth worker which can be pulled with the line of working members inclined to either the right or left of the direction of motion and work the earth equally well regardless of the direction of the incline.

Yet one other object of this invention is to provide a disc tiller which is easily turned to the right or left from the direction of motion when plowing with the line of discs inclined to either the right or left.

Another object of this invention is to provide a disc tiller which can be easily controlled by hydraulic or pneumatic means from a towing vehicle to vary the depth of cut and the angle of the line of discs relative to the forward motion of the disc tiller.

Various other objects, advantages, and features of the invention will become apparent to those skilled in the art from the following discussion, taken in conjunction with the accompanying drawings, in which:

FIG. 1 is a top plan view of the one-unit two-way disc tiller embodiment of this invention in a normal plowing position with the discs and frame inclined to the right;

FIG. 2 is a reduced top plan view of the disc tiller shown in FIG. 1 in another normal plowing position with the discs and frame inclined to the left;

FIG. 3 is a reduced top plan view of the disc tiller shown in FIG. 1 in the normal transport position with the discs and frame in line with the hitch;

FIG. 4 is a rear end elevational view of the one-unit two-way disc tiller with the discs and frame slightly inclined to the left;

FIG. 5 is an enlarged top plan view of the rear end portion of the one-unit two-way disc tiller;

FIG. 6 is an enlarged bottom plan view of the center portion of the rear end portion of the one-unit two-way disc tiller;

FIG. 7 is an enlarged side elevational view of the center portion of the one-unit two-way disc tiller;

FIG. 8 is a top plan view of the two-unit two-way disc tiller embodiment of this invention in a normal towing position with the discs and frame inclined to the left;

FIG. 9 is a reduced top plan view of the two-unit two-way disc tiller in another normal towing position with the discs and frame inclined to the right;

FIG. 10 is a reduced top plan view of the two-unit two-way disc tiller in the normal in line transport position;

FIG. 11 is a side elevational view of the rear end portion of the two-unit two-way disc tiller;

FIG. 12 is a cross-sectional view of the two-unit two-way disc tiller taken on line 12-12 of FIG. 8;

FIG. 13 is a side elevational view of the forward end portion of the two-unit two-way disc tiller shown in FIG. 8;

FIG. 14 is a view of the side mounted caster wheel taken on line 14—14 of FIG. 8; and FIG. 15 is a side elevational view of the forward end portion of the one-unit two-way disc tiller as shown in FIG. 1.

The following is a discussion and description of preferred specific embodiments of the improved disc tiller of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIGS. 1, 2 and 3, a preferred specific embodiment of this invention, the one-unit two-way disc tiller 1 is shown, generally indicated at 10. This preferred specific embodiment (1) of the one-unit two-way disc tiller 10 includes an elongated one-piece frame 12 with a disc assembly 14 thereunder, a front end caster wheel assembly 16, a rear end wheel assembly 18, a pivoted tow hitch assembly 20 and a steering linkage 22.

The elongated one-piece frame 12 is substantially comprised of one elongated member connecting the wheel assemblies 16 and 18, supporting the disc assembly 14 and mounting the tow hitch assembly 20. One end of the frame 12 is secured to the front end caster wheel 16, shown in detail in FIG. 15, and the other end is pivotally attached by a clevis joint 23 to the rear end wheel assembly 18, as shown in detail in FIGS. 4, 5 and 6. The tow hitch assembly 20 is pivotally mounted with the front end portion of the frame 12 as shown in detail in FIG. 7 having a pair of hydraulic cylinders 24 pivotally mounted with the frame 12 pivotally connected to a transverse member 26 on the tow hitch assembly 20. Also, the frame 12 has a pair of stops 28 extending therefrom which contact the rearwardly extending end 30 of the tow hitch assembly 20. A support member 32 extending from one side of the rear end portion of the frame 12 supports the crank member 34 of the steering linkage 22.

The tow hitch assembly 20 has a tow bar member 40 sufficiently long to extend past the forward end of the tiller 10 with a clevis hitch type coupling 42 on the end thereof; the rear end portion of tow bar 40 is pivotally mounted to move vertically about the transverse member 26 and rotate with a horizontal wheel member 44. The horizontal wheel 44 is attached to the frame 12 at the pivotal mount 46. The rearwardly extending end portion 30 of the tow hitch 20 extends horizontally from the transverse member 26. The pivotal mount 46 which includes a pin member 48 extending upward from the frame 12 through the horizontal wheel member 44 and transverse member 26. The horizontal wheel member 44 is connected to rotate with the crank member 34 by means of a cable 49. The tow bar 40 rotates about the pin 48, it is prevented from rotating too far in either direction by the end portion 30 contacting the stops 28; this protects the cylinders 24 and prevents adverse rotation. When the tow bar 40 is against the stops 28, it is in the optimum position for pulling relative the disk assembly 14; in practice this has been found to be an angle of approximately 25°.

The forward end caster wheel assembly 16 is shown in detail in FIG. 15; it includes a freely casterable wheel 52 mounted on a height adjustable standard 54 connected to a pivotally mounted end support 56 on the end of the frame 12. The adjustable standard 54 is connected with the pivotal end support 56 by linkage bars 58 arranged such that the standard 54 moves vertically retaining the wheel 52 vertical and is controlled in height adjustment by a hydraulic cylinder 60, the adjustment of which will be explained in the following. The pivotal end support 56 has a turning arm member 62 rigidly attached thereto on the top thereof which attaches the forward linkage rod 64 of the steering linkage 22.

The rear end wheel assembly 18 shown in detail in FIGS. 4, 5 and 6 includes a pair of caster wheels 70 mounted on a transversely pivotal end member, generally indicated at 72, which is pivotally attached by the clevis joint 23 of the frame 12. The caster wheels 70 are mounted wheel standards 71 on vertically height adjustable support members 74 which are connected by linkage arms 76 with the center member 78. The linkage arms 76 are pivotally attached to the end support members 74 and the center member 78 and are of equal length to move the support members 74 vertically with the wheels 70 remaining parallel. Movement of the support members 74 is provided by a linkage system having linkage arms 80 positioned on opposite sides of the center member 78 connected by arms 82 to a bellcrank 84 attached below the clevis joint 23 which is rotated by an attached hydraulic cylinder 86. The caster wheels 70 are prevented from rotating to a position which would prevent them from following the path of the disc tiller 10 by stops 88 located on the normally forward portion of the support members 74 which contact knob members 90 on the top of the wheel standards 71.

The knobs 90 contact the stops 88 preventing adverse rotation of the wheels 70, and they are attached to a chain 92 connected with an extended attachment member 94 on the end of the frame 12; this provides means to initially turn the wheels 70. The steering assembly 22 has a rear linkage rod 96 pivotally attached to the center member 78 and the crank member 34.

In operation of the one-unit two-way disc tiller 10 of this invention, the height of the frame 12 and the disc assembly 14 determines what depth the disc 14 cuts into the ground; this is preferably controlled from the towing vehicle through the hydraulic cylinders 60 and 86. When the cylinder 60 is fully extended and cylinder 86 is fully retracted, the frame 12 is at its highest position relative the ground and the disc assembly 14 is substantially above the ground; as the cylinders 60 and 86 are retracted and extended, respectively, the frame 12 is lowered relative the ground and contacted therewith. In a normal plowing operation the disc tiller 10 is pulled as shown in FIGS. 1 or 2 as inclined either to the right or left and the frame 12 is in a lowered position. The hydraulic cylinders 24 control the position of the tow hitch assembly 20 angularly relative to the frame 12 and are preferably controllable from the towing vehicle. The cylinders 24 react in opposite directions, one extending and the other retracting to rotate the tow bar 40. When the tow bar 40 is rotated horizontally, the horizontal wheel member 44 turns the crank member 34 via the cable 49 which moves the linkage rods 64 and 96 thereby turning the front wheel assembly 16 and the rear wheel assembly 18, respectively, to position their wheels in the proper position to follow the towing vehicle. When the disc tiller 10 is pulling a straight path with the frame 12 inclined to one direction or the other, the cylinders 24 and/or stops 28 resist the natural tendency of the plowing disc to turn so the discs roll along the ground. Turns can be made in either direction when the disc tiller 10 is inclined in either direction; when a turn is made, the caster wheels 52 and 70 rotate in their pivots to follow the path of towing vehicle. The one-unit disc tiller 10 can also be easily positioned for easy and rapid transportation by raising the frame 12 to the highest position as described then rotating the frame 12 in line with the tow bar 40 as shown in FIG. 3. When the disc tiller 10 is in this roading position, the disc assembly 14 is not in contact with the ground and it will easily follow the towing vehicle.

Another preferred specific embodiment of this invention, a two-unit two-way disc tiller 2, generally indicated at 100, is shown in FIGS. 8, 9 and 10. This preferred specific embodiment of the two-unit two-way disc tiller 2 includes an elongated jointed frame 110 with a disc assembly 112 supported therebelow, a front end caster wheel assembly 114, span wheel assembly 116, rear end wheel assembly 118, and a pivotally mounted tow hitch assembly 120 connected to the end wheel assemblies 114 and 116.

The frame 110 is preferably comprised of three elongated members 121, 122 and 123 equally spaced and connecting the wheel assemblies 114, 116 and 118 and the tow hitch assembly 120. The frame 110, as shown in the figures, has a vertically pivotable hinged joint in the center portion thereof in the three members 121, 122 and 123; the joint is generally indicated at 124. Below the center frame member 122 the disc assembly 112 is supported on vertical members 126. The joint 124 provides easy flexure of the frame to follow the ground terrain.

The front end wheel assembly 114 is similar to that of the one-unit two-way disc tiller, supra, with exception of the turning member, here indicated as 128 and shown in FIG. 13 with similar component numerals. The turning member 128 is a horizontal pulley mounted with the end support member 56 attached to a cable 130 connecting same with the tow hitch assembly 120 to rotate in conjunction therewith.

The rear wheel assembly 118 is shown in FIG. 11; it includes a wheel 132 mounted on a vertically hinged and horizontally pivotable support member 134 that is substantially free to caster horizontally, hydraulic cylinder 136 and a turning stop member 138 attached to a cable 140. The wheel 132 is mounted on the trailing arm member 142 of the support member 134 operable to be pivoted about the vertical portion 144 of the support member 134 by the hydraulic cylinder 136 thus changing the height of the frame 110 relative the ground. The upper portion 146 of the support member 134 is pivotally mounted at the pivot 148 and extends forward therefrom a distance. The turning stop member 138 has a horizontally pivoted wheel connected to the cable 140 with a horizontal arm 150 and vertical contact member 152; this assembly rotates in conjunction with the tow hitch assembly 120 to prevent adverse horizontal rotation of the rear wheel 132.

The span wheel assembly 116 is preferably mounted in the middle of the frame 110 and attached to the rear portion of same or to the rear of the joint 124. This wheel assembly 116 includes a pair of vertically mounted wheel carrying standards 158 with wheels 160, positioned on opposite sides of the frame 110, frame mounted support members 162 with wheel support linkage bars 164 connecting them to wheel standard mounts 166, hydraulic cylinders 168 and transverse linkage rods 170 attached to a bellcrank 172 and the wheel support linkage bars 164, and a wheel lock apparatus 174. The hydraulic cylinder 168 is attached on one end to the frame 110 and on the other end to the bellcrank 172 which is pivotally mounted on the center frame member 122. The transverse linkage rods 170 are preferably adjustable in length similarly as a turnbuckle and connect the bellcrank 172 to lift levers 176 on the upper wheel supporting linkage bar 164. This span wheel linkage apparatus is operable to raise and lower the wheels 160 relative to the frame 110 as indicated in FIG. 14; the hydraulic cylinder 168 is controlled from the towing vehicle in conjunction with the other wheel assemblies 114 and 118. The wheel lock apparatus 174 has a spring retained locking arm member 178 mounted on the wheel standard mount 166 operable to engage in a slot 180 in the upper end of the wheel standard 158 when the wheels 160 rotate to align with the frame 110. The wheels 160 align with the frame 110 when the disc tiller 100 is in the in line position as shown in FIG. 10.

The tow hitch assembly 120 of this disc tiller 100 is substantially the same as that of the one-unit two-way disc tiller 10; it includes a tow bar 182 vertically pivotally mounted from the transverse member 184 which is attached to hydraulic cylinders 186, horizontal wheel 188 and the rearward extending end portion 190 that contacts the stops 192. The tow hitch 120 operates as described, supra, with the exception of the wheel 188. The wheel 188 attaches cables 130 and 140 to turn the front end wheel assembly 114 and the turning stop member 138 on the rear wheel assembly.

In normal operation of the two-unit two-way disc tiller 100 of this invention, it is positioned, pulled and turned similar to the previously described one-unit two-way disc tiller 10. The cylinders 186 turn the tow bar 182 relative the frame 110 and in turn rotate the front wheel assembly 114 and the turning stop member 138 of the rear wheel assembly so the wheels are positioned to easily follow the towing vehicle. The towing vehicle preferably has the hydraulic system controls for the disc tiller and can control the wheel assemblies hydraulic cylinders together or independently at the operator's preference. With the disc assembly 112 raised above the ground, the disc tiller 100 can be easily rotated to the in line position for transportation as shown in FIG. 10, and the center wheels 160 are held in the straight position by the lock assembly 174 to provide for better trailing; the center wheels 160 are unlocked when the disc tiller is to be used again. When in the in line position, the front 114 and rear 118 wheel assemblies are substantially positioned as shown in FIGS. 11 and 13, respectively.

In use it is seen that the one-unit two-way and two-unit two-way disc tillers of the herein described preferred specific embodiments of this invention provide an easily operable and efficient disc tiller which can be drawn by many towing vehicles normally used in this type of tilling operation. Also, it is seen that a disc tiller has been provided which can be easily positioned for safe and relatively rapid transportation between places where it is used. Also, it is seen the disc tiller can be turned in either direction when plowing. Additionally, it is obvious the disc tiller of this invention can be constructed in a length to plow a substantial swath and can be pulled and turned at a speed to generally speed the plowing operation.

While the invention has been described in conjunction with preferred specific embodiments thereof, it will be understood that this description is intended to illustrate and not limit the scope of the invention, which is defined by the following claims.

We claim:

1. Single-unit two-way earth working means comprising:
   a. an elongated horizontal frame member, having earth working members supported therebelow,
   b. a transverse support member pivotally attached at a center portion to a rear end portion of said horizontal frame member and operable to pivot horizontally,
   c. an elongated hitch member pivotally mounted on a forward end portion of said horizontal frame member and extending forwardly therefrom,
   d. pivotable wheel means mounted on the forward end of said horizontal frame member,
   e. caster wheels mounted on respective opposite end portions of said transverse support member,
   f. first linkage means connected with said transverse support member and said wheel means operable to horizontally angle said wheel means, and said castor wheels,
   g. second linkage means connected to said first linkage means, said frame member, and operably connected to said hitch member,
   h. a third linkage means connected with said transverse support member and said horizontal frame member restricting the extent of pivotal movement of said horizontal frame member about said transverse member, i. turning linkage means connected to said frame member and said hitch member operable to rotate said horizontal frame member relative to said hitch member from the earth working to the trailing position, j. said first linkage means is a bar linkage means that has two elongated bar members and one idler member, k. one of said elongated bar members is connected on k. end to said wheel means operable to angularly rotate said wheel means and pivotally connected on the other end to said idler member, l. the other one of said elongated bar members is connected at one end portion to said idler member and an opposite end portion is pivotally connected to said transverse support member, and m. said idler member is connected by a support member to said horizontal frame member whereby said first linkage means correlates pivotal movement of said wheel means and said caster wheels.

2. The earth working means described in Claim 1 wherein:

a. said second linkage means includes a cable means connected to a wheel member mounted on said hitch member and said cable means is trained about said idler member, and b. said second linkage means is operable to actuate said first linkage means on actuation of said turning linkage means and movement of said horizontal frame member to position said forward wheel means and said transverse support member for trailing movement.

3. The earth working means described in Claim 2, wherein:

a. said third linkage means has a chain member connected to said rear end portion of said horizontal frame member and to said caster wheels, and b. said third linkage means is operable to position said caster wheels in the forward motion position relative said hitch member and said horizontal frame member.

4. The earth working means described in Claim 3, wherein:

a. said turning linkage means has a piston and cylinder means pivotally mounted on said horizontal frame member and pivotally mounted on said hitch member, and b. said piston and cylinder means is operable upon control from the vehicle normally pulling said earth working means to rotate said horizontal frame member relative to said hitch member, and c. said pivotable wheel means and said caster wheels have fluid control means operable to vary the height of said horizontal frame member above ground surface.

5. A multi-unit two-way earth worker comprising:

a. an elongated frame means having an earth working means supported therebelow, b. a plurality of caster means including one of said caster means mounted on each end of said frame means and one each of said caster means mounted on opposed sides of a center portion of said frame means, c. hitch means pivotally mounted to a forward end portion of said frame means, d. cable linkage means connected to said hitch means and said caster means connected to opposite ends of said frame means operable to properly position said frame means relative to said hitch means, e. a turning linkage means connected to said frame means and said hitch means, f. said frame means has a hinge therein between the forward end portion and a rear end portion to allow flexural movement for movement over rough terrain, g. said cable linkage means includes a cable connected to said hitch means and to said caster means mounted on the rear of said frame means and a cable connected to said hitch means to said caster means mounted on the forward end of said frame means, and h. said turning linkage means includes piston and cylinder means pivotally attached to said frame means and to said hitch means operable to rotate said frame means relative said hitch means.

6. The earth worker as described in claim 5, wherein caster means mounted on opposite sides and centrally of said frame means having lock means connected to said frame means and engagable with said central said caster means to lock for roading condition aligned with said frame means.

* * * * *

UNITED STATES PATENT OFFICE
CERTIFICATE OF CORRECTION

Patent No. 3,703,932      Dated November 28, 1972

Inventor(s) Floyd W. Tuttle et al.

It is certified that error appears in the above-identified patent and that said Letters Patent are hereby corrected as shown below:

Column 7, line 9, after "on" insert -- one --; line 10, cancel "k.". Column 8, line 34, after "means" insert -- and --.

Signed and sealed this 15th of May 1973.

(SEAL)
Attest:

EDWARD M. FLETCHER, JR.
Attesting Officer

ROBERT GOTTSCHALK
Commissioner of Patents

FORM PO-1050 (10-69)